(12) United States Patent
Hall et al.

(10) Patent No.: US 10,960,723 B1
(45) Date of Patent: Mar. 30, 2021

(54) WHEEL-MOUNTED SUSPENSION ACTUATORS

(71) Applicants: Jonathan L. Hall, Emerald Hills, CA (US); Peteris K. Augensberg, Woodside, CA (US); Matthew M. Torok, Los Altos, CA (US); Islam Mohsen Shawki, Sunnyvale, CA (US); Troy A. Carter, Sunnyvale, CA (US); Roland R. Smith, Sunnyvale, CA (US)

(72) Inventors: Jonathan L. Hall, Emerald Hills, CA (US); Peteris K. Augensberg, Woodside, CA (US); Matthew M. Torok, Los Altos, CA (US); Islam Mohsen Shawki, Sunnyvale, CA (US); Troy A. Carter, Sunnyvale, CA (US); Roland R. Smith, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 105 days.

(21) Appl. No.: 16/112,868

(22) Filed: Aug. 27, 2018

Related U.S. Application Data

(60) Provisional application No. 62/563,233, filed on Sep. 26, 2017.

(51) Int. Cl.
*B60G 3/20* (2006.01)
*B60G 17/015* (2006.01)
*B60G 7/00* (2006.01)

(52) U.S. Cl.
CPC ............ *B60G 3/202* (2013.01); *B60G 7/001* (2013.01); *B60G 17/015* (2013.01); *B60G 2204/40* (2013.01)

(58) Field of Classification Search
CPC .. B60G 17/015; B60G 17/0157; B60G 3/202; B60G 7/001; B60G 2204/30; B60G 2204/40; B60G 2204/42
See application file for complete search history.

(56) References Cited

U.S. PATENT DOCUMENTS

| | | |
|---|---|---|
| 2,901,239 A | 8/1959 | Sethna |
| 3,236,334 A | 2/1966 | Wallerstein, Jr. |
| 3,322,379 A | 5/1967 | Flannelly |
| 3,368,824 A | 2/1968 | Julien |

(Continued)

FOREIGN PATENT DOCUMENTS

| | | |
|---|---|---|
| CN | 108215946 A | 6/2018 |
| CN | 208439009 U | 1/2019 |

(Continued)

OTHER PUBLICATIONS daimler.com, "Suspension: The world's first suspension system with 'eyes'", https://media.daimler.com/marsMediaSite/en/instance/ko/Suspension-The-worlds-first-suspension-system-with-eyes.xhtml?oid=9904306, May 15, 2013 (6 pp).

(Continued)

*Primary Examiner* — Frank B Vanaman
(74) *Attorney, Agent, or Firm* — Young Basile Hanlon & MacFarlane, P.C.

(57) ABSTRACT

A vehicle wheel assembly includes a wheel, a tire supported by the wheel, an internal space defined by the wheel, a wheel hub that is rotatably connected to the wheel and is located in the internal space, and a mass actuator that is connected to the wheel hub and located in the internal space.

20 Claims, 12 Drawing Sheets

(56) References Cited

U.S. PATENT DOCUMENTS

| | | |
|---|---|---|
| 3,441,238 A | 4/1969 | Flannelly |
| 3,781,032 A | 12/1973 | Jones |
| 3,970,162 A | 7/1976 | Le Salver et al. |
| 4,530,514 A | 7/1985 | Ito |
| 4,537,420 A | 8/1985 | Ito et al. |
| 4,589,678 A | 5/1986 | Lund |
| 4,613,152 A | 9/1986 | Booher |
| 4,634,142 A | 1/1987 | Woods et al. |
| 4,637,628 A | 1/1987 | Perkins |
| 4,643,270 A | 2/1987 | Beer |
| 4,784,378 A | 11/1988 | Ford |
| 4,834,416 A | 5/1989 | Shimoe et al. |
| 4,893,832 A | 1/1990 | Booher |
| 4,922,159 A | 5/1990 | Phillips et al. |
| 4,960,290 A | 10/1990 | Bose |
| 4,981,309 A | 1/1991 | Froeschle et al. |
| 4,991,698 A * | 2/1991 | Hanson .............. B60B 9/005 188/380 |
| 5,033,028 A | 7/1991 | Browning |
| 5,060,959 A | 10/1991 | Davis et al. |
| 5,244,053 A | 9/1993 | Kashiwagi |
| 5,364,081 A | 11/1994 | Hartl |
| 5,401,053 A | 3/1995 | Sahm et al. |
| 5,409,254 A | 4/1995 | Minor et al. |
| 5,468,055 A * | 11/1995 | Simon .............. B60B 9/005 188/267 |
| 5,507,518 A | 4/1996 | Nakahara et al. |
| 5,517,414 A | 5/1996 | Hrovat |
| 5,678,847 A | 10/1997 | Izawa et al. |
| 5,810,335 A | 9/1998 | Wirtz et al. |
| 5,829,764 A | 11/1998 | Griffiths |
| 5,880,542 A | 3/1999 | Leary et al. |
| 6,032,770 A | 3/2000 | Alcone et al. |
| 6,113,119 A | 9/2000 | Laurent et al. |
| 6,170,838 B1 | 1/2001 | Laurent et al. |
| 6,249,728 B1 | 6/2001 | Streiter |
| 6,357,770 B1 | 3/2002 | Carpiaux et al. |
| 6,364,078 B1 | 4/2002 | Parison et al. |
| 6,443,436 B1 | 9/2002 | Schel |
| 6,470,248 B2 | 10/2002 | Shank et al. |
| 6,502,837 B1 | 1/2003 | Hamilton et al. |
| 6,634,445 B2 | 10/2003 | Felsing et al. |
| 6,637,561 B1 | 10/2003 | Collins et al. |
| 6,873,891 B2 | 3/2005 | Moser et al. |
| 6,926,288 B2 | 8/2005 | Bender |
| 6,940,248 B2 | 9/2005 | Maresca et al. |
| 6,945,541 B2 | 9/2005 | Brown |
| 7,017,690 B2 | 3/2006 | Burke |
| 7,032,723 B2 | 4/2006 | Quaglia et al. |
| 7,051,851 B2 | 5/2006 | Svartz et al. |
| 7,140,601 B2 | 11/2006 | Nesbitt et al. |
| 7,195,250 B2 | 3/2007 | Knox et al. |
| 7,202,577 B2 | 4/2007 | Parison et al. |
| 7,302,825 B2 | 12/2007 | Knox |
| 7,308,351 B2 | 12/2007 | Knoop et al. |
| 7,392,997 B2 | 7/2008 | Sanville et al. |
| 7,401,794 B2 | 7/2008 | Laurent et al. |
| 7,421,954 B2 | 9/2008 | Bose |
| 7,427,072 B2 | 9/2008 | Brown |
| 7,484,744 B2 | 2/2009 | Galazin et al. |
| 7,502,589 B2 | 3/2009 | Howard et al. |
| 7,543,825 B2 | 6/2009 | Yamada |
| 7,551,749 B2 | 6/2009 | Rosen et al. |
| 7,641,010 B2 | 1/2010 | Mizutani et al. |
| 7,644,938 B2 | 1/2010 | Yamada |
| 7,654,540 B2 | 2/2010 | Parison et al. |
| 7,818,109 B2 | 10/2010 | Scully |
| 7,823,891 B2 | 11/2010 | Bushko et al. |
| 7,932,684 B2 | 4/2011 | O'Day et al. |
| 7,962,261 B2 | 6/2011 | Bushko et al. |
| 7,963,529 B2 | 6/2011 | Oteman et al. |
| 7,976,038 B2 | 7/2011 | Gregg |
| 8,047,551 B2 | 11/2011 | Morris et al. |
| 8,067,863 B2 | 11/2011 | Giovanardi |
| 8,095,268 B2 | 1/2012 | Parison et al. |
| 8,099,213 B2 | 1/2012 | Zhang et al. |
| 8,109,371 B2 | 2/2012 | Kondo et al. |
| 8,112,198 B2 | 2/2012 | Parison, Jr. et al. |
| 8,113,522 B2 | 2/2012 | Oteman et al. |
| 8,127,900 B2 | 3/2012 | Inoue |
| 8,157,036 B2 | 4/2012 | Yogo et al. |
| 8,191,874 B2 | 6/2012 | Inoue et al. |
| 8,282,149 B2 | 10/2012 | Kniffin et al. |
| 8,336,319 B2 | 12/2012 | Johnston et al. |
| 8,356,861 B2 | 1/2013 | Kniftin et al. |
| 8,360,387 B2 | 1/2013 | Breen et al. |
| 8,370,022 B2 | 2/2013 | Inoue et al. |
| 8,387,762 B2 | 3/2013 | Kondo et al. |
| 8,417,417 B2 | 4/2013 | Chen et al. |
| 8,428,305 B2 | 4/2013 | Zhang et al. |
| 8,466,639 B2 | 6/2013 | Parison, Jr. et al. |
| 8,490,761 B2 | 7/2013 | Kondo |
| 8,499,903 B2 | 8/2013 | Sakuta et al. |
| 8,548,678 B2 | 10/2013 | Ummethala et al. |
| 8,579,311 B2 | 11/2013 | Butlin, Jr. et al. |
| 8,641,052 B2 | 2/2014 | Kondo et al. |
| 8,641,053 B2 | 2/2014 | Pare et al. |
| 8,668,060 B2 | 3/2014 | Kondo et al. |
| 8,682,530 B2 | 3/2014 | Nakamura |
| 8,701,845 B2 | 4/2014 | Kondo |
| 8,725,351 B1 | 5/2014 | Selden et al. |
| 8,744,680 B2 | 6/2014 | Rieger et al. |
| 8,744,694 B2 | 6/2014 | Ystueta |
| 8,757,309 B2 | 6/2014 | Schmitt et al. |
| 8,783,430 B2 | 7/2014 | Brown |
| 8,890,461 B2 | 11/2014 | Knox et al. |
| 8,938,333 B2 | 1/2015 | Bose et al. |
| 9,062,983 B2 | 6/2015 | Zych |
| 9,079,473 B2 | 7/2015 | Lee et al. |
| 9,102,209 B2 | 8/2015 | Giovanardi et al. |
| 9,291,300 B2 | 3/2016 | Parker et al. |
| 9,316,667 B2 | 4/2016 | Ummethala et al. |
| 9,349,304 B2 | 5/2016 | Sangermano, II et al. |
| 9,399,384 B2 | 7/2016 | Lee et al. |
| 9,533,539 B2 | 1/2017 | Eng et al. |
| 9,550,495 B2 | 1/2017 | Tatourian et al. |
| 9,625,902 B2 | 4/2017 | Knox |
| 9,643,467 B2 | 5/2017 | Selden et al. |
| 9,702,349 B2 | 7/2017 | Anderson et al. |
| 9,855,887 B1 | 1/2018 | Potter et al. |
| 9,868,332 B2 | 1/2018 | Anderson et al. |
| 9,975,391 B2 | 5/2018 | Tseng et al. |
| 10,065,474 B2 | 9/2018 | Trangbaek |
| 10,093,145 B1 | 10/2018 | Vaughan et al. |
| 10,245,984 B2 | 4/2019 | Parker et al. |
| 10,300,760 B1 | 5/2019 | Aikin et al. |
| 10,315,481 B2 | 6/2019 | Lu et al. |
| 10,377,371 B2 | 8/2019 | Anderson et al. |
| 10,513,161 B2 | 12/2019 | Anderson et al. |
| 2003/0030241 A1 | 2/2003 | Lawson |
| 2004/0074720 A1 | 4/2004 | Thieltges |
| 2004/0226788 A1 | 11/2004 | Tanner |
| 2005/0051986 A1 | 3/2005 | Galazin et al. |
| 2005/0096171 A1 | 5/2005 | Brown |
| 2005/0199457 A1 | 9/2005 | Beck |
| 2005/0206231 A1 | 9/2005 | Lu et al. |
| 2005/0247496 A1 | 11/2005 | Nagaya |
| 2006/0043804 A1 | 3/2006 | Kondou |
| 2006/0076828 A1 | 4/2006 | Lu et al. |
| 2006/0119064 A1 | 6/2006 | Mizuno et al. |
| 2006/0181034 A1 | 8/2006 | Wilde et al. |
| 2006/0266599 A1 | 11/2006 | Denys et al. |
| 2006/0273530 A1 | 12/2006 | Zuber |
| 2007/0069496 A1 | 3/2007 | Rinehart et al. |
| 2007/0107959 A1 | 5/2007 | Suzuki et al. |
| 2007/0199750 A1 | 8/2007 | Suzuki et al. |
| 2007/0210539 A1 | 9/2007 | Hakui et al. |
| 2008/0017462 A1 | 1/2008 | Mizutani et al. |
| 2008/0100020 A1 | 5/2008 | Gashi et al. |
| 2008/0164111 A1 | 7/2008 | Inoue et al. |
| 2008/0283315 A1 | 11/2008 | Suzuki et al. |
| 2009/0033055 A1 | 2/2009 | Morris et al. |
| 2009/0064808 A1 | 3/2009 | Parison et al. |
| 2009/0095584 A1 | 4/2009 | Kondo et al. |

(56) References Cited

U.S. PATENT DOCUMENTS

| | | |
|---|---|---|
| 2009/0120745 A1 | 5/2009 | Kondo et al. |
| 2009/0121398 A1 | 5/2009 | Inoue |
| 2009/0173585 A1 | 7/2009 | Kappagantu |
| 2009/0174158 A1 | 7/2009 | Anderson et al. |
| 2009/0198419 A1 | 8/2009 | Clark |
| 2009/0218867 A1 | 9/2009 | Clark |
| 2009/0243402 A1 | 10/2009 | O'Day et al. |
| 2009/0243598 A1 | 10/2009 | O'Day |
| 2009/0273147 A1 | 11/2009 | Inoue et al. |
| 2009/0286910 A1 | 11/2009 | Bloomfield |
| 2009/0302559 A1 | 12/2009 | Doerfel |
| 2009/0321201 A1 | 12/2009 | Sakuta et al. |
| 2010/0044977 A1 | 2/2010 | Hughes et al. |
| 2010/0059959 A1 | 3/2010 | Kim |
| 2010/0207344 A1 | 8/2010 | Nakamura |
| 2010/0222960 A1 | 9/2010 | Oida et al. |
| 2010/0252376 A1 | 10/2010 | Chern et al. |
| 2011/0115183 A1 | 5/2011 | Alesso et al. |
| 2012/0059547 A1 | 3/2012 | Chen |
| 2012/0109483 A1 | 5/2012 | O'Dea et al. |
| 2012/0153718 A1 | 6/2012 | Rawlinson et al. |
| 2012/0181757 A1 | 7/2012 | Oteman et al. |
| 2012/0187640 A1 | 7/2012 | Kondo et al. |
| 2012/0193847 A1 | 8/2012 | Muragishi et al. |
| 2012/0305348 A1 | 12/2012 | Katayama et al. |
| 2012/0306170 A1 | 12/2012 | Serbu et al. |
| 2013/0060422 A1 | 3/2013 | Ogawa et al. |
| 2013/0060423 A1 | 3/2013 | Jolly |
| 2013/0106074 A1 | 5/2013 | Koku et al. |
| 2013/0221625 A1 | 8/2013 | Pare et al. |
| 2013/0229074 A1 | 9/2013 | Haferman et al. |
| 2013/0233632 A1 | 9/2013 | Kim et al. |
| 2013/0341143 A1 | 12/2013 | Brown |
| 2014/0145498 A1 | 5/2014 | Yamakado et al. |
| 2014/0260233 A1 | 9/2014 | Giovanardi et al. |
| 2014/0312580 A1 | 10/2014 | Gale |
| 2014/0358378 A1 | 12/2014 | Howard et al. |
| 2015/0123370 A1 | 5/2015 | Lee et al. |
| 2015/0197130 A1 | 7/2015 | Smith et al. |
| 2015/0224845 A1 | 8/2015 | Anderson et al. |
| 2015/0231942 A1 | 8/2015 | Trangbaek et al. |
| 2016/0059658 A1 | 3/2016 | Kuriki |
| 2016/0096458 A1 | 4/2016 | Parker |
| 2016/0159187 A1 | 6/2016 | Mohamed |
| 2016/0167743 A1 | 6/2016 | Melcher |
| 2016/0291574 A1 | 10/2016 | Parison |
| 2016/0339823 A1 | 11/2016 | Smith et al. |
| 2017/0047823 A1 | 2/2017 | Sangermano, III et al. |
| 2017/0129367 A1 | 5/2017 | Hein |
| 2017/0129371 A1 | 5/2017 | Knox |
| 2017/0129372 A1 | 5/2017 | Hein et al. |
| 2017/0129373 A1 | 5/2017 | Knox et al. |
| 2017/0137023 A1 | 5/2017 | Anderson et al. |
| 2017/0203673 A1 | 7/2017 | Parker |
| 2017/0253101 A1 | 9/2017 | Kuriki |
| 2017/0253155 A1 | 9/2017 | Knox et al. |
| 2018/0022178 A1 | 1/2018 | Xi |
| 2018/0029585 A1 | 2/2018 | Tanimoto |
| 2018/0089901 A1 | 3/2018 | Rober et al. |
| 2018/0105082 A1 | 4/2018 | Knox |
| 2018/0126816 A1 | 5/2018 | Kondo et al. |
| 2018/0162186 A1 | 6/2018 | Anderson et al. |
| 2018/0162187 A1 | 6/2018 | Trangbaek |
| 2018/0297587 A1 | 10/2018 | Kasaiezadeh Mahabadi et al. |
| 2018/0345747 A1 | 12/2018 | Boon et al. |
| 2019/0118604 A1 | 4/2019 | Suplin et al. |
| 2019/0248203 A1 | 8/2019 | Krehmer et al. |
| 2019/0308484 A1 | 10/2019 | Belter et al. |
| 2020/0088214 A1 | 3/2020 | Woodard et al. |
| 2020/0171907 A1 | 6/2020 | Hall et al. |
| 2020/0216128 A1 | 7/2020 | Doerksen |

FOREIGN PATENT DOCUMENTS

| | | |
|---|---|---|
| DE | 102009060213 A1 | 6/2011 |
| DE | 202012002846 U1 | 7/2012 |
| DE | 102015003530 A1 | 9/2016 |
| DE | 102016000686 A1 | 7/2017 |
| DE | 102018208774 A1 | 12/2019 |
| EP | 2072855 A1 | 6/2009 |
| EP | 2233330 B1 | 2/2013 |
| EP | 3088230 A1 | 11/2016 |
| GB | 2437633 A | 10/2007 |
| JP | 2006200734 A | 8/2006 |
| JP | 2012002300 A | 1/2012 |
| JP | 2012167757 A | 9/2012 |
| JP | 2013244841 A | 12/2013 |
| JP | 5796315 B2 | 10/2015 |
| KR | 101509600 B1 | 4/2015 |
| WO | 9304883 A1 | 3/1993 |
| WO | 2012028228 A2 | 3/2012 |
| WO | 2014004118 A1 | 1/2014 |
| WO | 2014004119 A1 | 1/2014 |
| WO | 2014094934 A1 | 6/2014 |
| WO | 2015153811 A1 | 10/2015 |
| WO | 2015169530 A1 | 11/2015 |
| WO | 2016120044 A1 | 8/2016 |
| WO | 2017055151 A1 | 4/2017 |

OTHER PUBLICATIONS youtube.com., KSSofficial, "Miniature Ball Screw With Ball Spline / English", Published on May 10, 2013, https://www.youtube.com/watch?v=vkcxmM0iC8U (2 pp).

Nippon Bearing, "Ball Screw Spline SPBR/SPBF", Product Description, Date Unknown, Downloaded Jun. 28, 2019, https://www.nbcorporation.com/shop/ball-spline/spbr-spbf/ (2 pp).

Monroe Intelligent Suspension, "CVSA2/KINETIC: Low Energy for High Performance", www.monroeintelligentsuspension.com/products/cvsa2-kinetic/, Date Unknown, Downloaded Mar. 2, 2017, 2 pp.

Tenneco, "Integrated Kinetic, H2 CES System, Ride Control Innovation, Accelerated", Rev. Sep. 2011, 4 pp.

porsche.com, "Porsche AG: Porsche 918 RSR—Racing Laboratory With Even Higher-Performance Hybrid Drive—Porsche USA", Current Press Releases dated Jan. 10, 2011, Downloaded Mar. 13, 2017, www. porsche.com/usa/aboutporsche/pressreleases/pag/?pool=international-de&id-2011-01-10, 6 pp.

autoblog.com, "Porsche (finally) Unleashes Full, Official Details in 918 Spyder—Autoblog", Sep. 9, 2013, www.autoblog.com/2013/09/09/porsche-official-detials-918-spyder-frankfurt/ , Downloaded Mar. 13, 2017, 26 pp.

press.porsche.com, "Introducing the Porsche 918 Spyder", Date Unknown, http://press.porsche.com/news/release.php?id-787, Downloaded Mar. 13, 2017, 7 pp.

Edren, Johannes, "Motion Modelling and Control Strategies of Over-Actuated Vehicles", Doctoral Thesis, Stockholm 2014 (56 pp).

Bolognesi, P., et al., "FEM Modeling and Analysis of a Novel Rotary-Linear Isotropic Brushless Machine", XIX International Conference of Electrical Machines—ICEM 2010, Rome (6 pp).

Xu, Lei, et. al., "Design and Analysis of a Double-Stator Linear-Rotary Permanent-Magnet Motor", IEEE Transactions un Applied Superconductivity, vol. 26, No. 4, Jun. 2016, (4 pp).

Cosford, J., "Is it a fair fight? Hydraulics vs. electrics", https://www.mobilehydraulictips.com/fair-tight-hydraulics-vs-electrics/, Mar. 28, 2014 (10 pp).

Wikipedia, "Trailing-arm suspension", https://en.wikipedia.org/wiki/Trailing-arm_suspension, downloaded Sep. 3, 2019 (2 pp).

SAE International, "Michelin re-invents the wheel", Oct. 14, 2008, Downloaded Sep. 7, 2017, http://articles.sae.org/4604/ (2 pp).

\* cited by examiner

WHEEL-MOUNTED SUSPENSION ACTUATORS

CROSS-REFERENCE TO RELATED APPLICATIONS

This application claims the benefit of U.S. Provisional Application No. 62/563,233, filed on Sep. 26, 2017, the content of which is hereby incorporated by reference in its entirety for all purposes.

TECHNICAL FIELD

This disclosure relates to vehicles and, in particular, suspension systems thereof.

BACKGROUND

Active suspension actuators can respond to forces applied to the wheels of a vehicle. For example, forces can be applied in opposition to a bump or vibration to lessen the sensation associated with the bump or vibration.

SUMMARY

One aspect of the disclosure is a vehicle wheel assembly that includes a wheel, a tire supported by the wheel, an internal space defined by the wheel, a wheel hub that is rotatably connected to the wheel and is located in the internal space, and a mass actuator that is connected to the wheel hub and located in the internal space.

Another aspect of the disclosure is a vehicle wheel assembly that includes a wheel hub that defines a rotation axis, and a wheel that has a wheel rim portion. The wheel rim portion is connected to the wheel hub for rotation around the rotation axis, the wheel rim portion is compliantly connected to the wheel hub for translation in a plane that is generally perpendicular to the rotation axis, and the wheel rim portion is formed in part from a ferromagnetic material. The vehicle wheel assembly also includes a tire that is supported by the wheel, an internal space defined by the wheel, and electromagnetic actuators that are connected to the wheel hub, located in the internal space, and operable to apply at least one of an attractive force or a repulsive force to the wheel rim portion.

Another aspect of the disclosure is a vehicle wheel assembly that includes a wheel, an internal space defined by the wheel, a tire that is supported by the wheel and has internal chambers that are sealed relative to each other are pressurizable separately at differing pressures, a manifold that is located in the internal space to supply and bleed pressure from the internal chambers, and fluid passages that connect the manifold to the internal chambers.

DETAILED DESCRIPTION

This disclosure is direction to suspension actuators that are mounted within vehicle wheels, which avoids the need to package these components inboard within a body of a vehicle. In some implementations mass actuators, which counter externally-applied forces by accelerating a mass, are packaged within the internal space of a wheel. These actuators may be used in vehicles that place braking components inboard in the vehicle body, which allows more space inside the wheel to be utilized, resulting in increased masses and longer stroke lengths.

Figure 1:
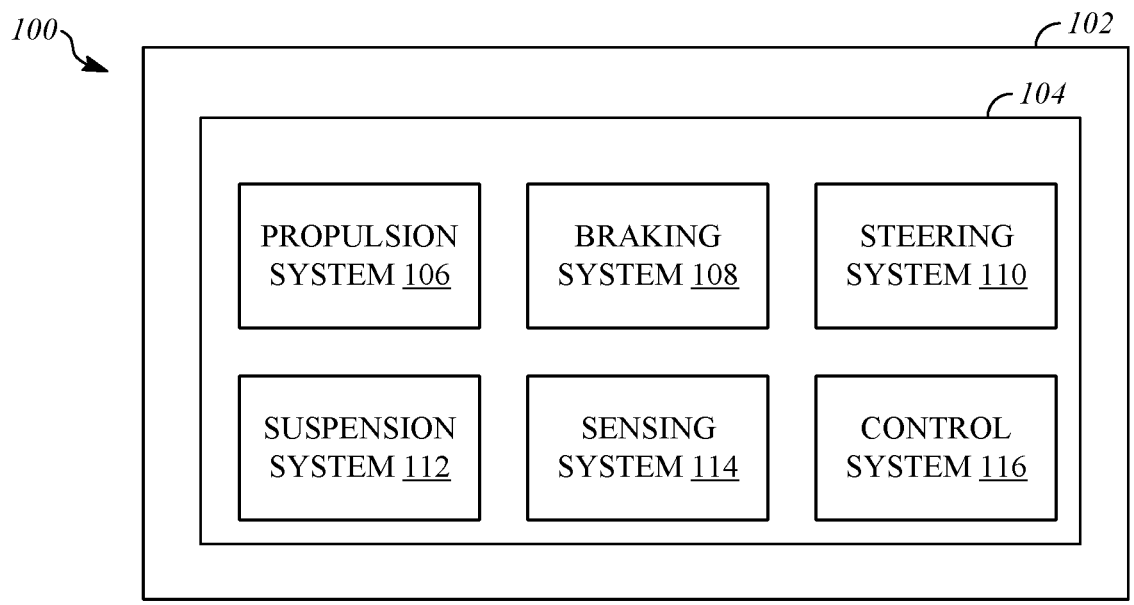
FIG. 1 is a block diagram showing a vehicle according to an example.

FIG. 1 is a block diagram that shows an example of a vehicle 100. The vehicle 100 includes a vehicle body 102 and a drive system 104 that is connected to the vehicle body 102. The vehicle body 102 supports that drive system 104 and may define an interior space such as a passenger compartment or a cargo compartment. The drive system 104 includes various subsystems that are configured to move the vehicle 100. The drive system 104 includes a propulsion system 106, a braking system 108, a steering system 110, a suspension system 112, a sensing system 114, and a control system 116. The drive system 104 may be an autonomous drive system that operates the various subsystems to move the vehicle 100 to a location, which may be selected by a user, under automated control, during which some or all of the driving tasks associated with operating a vehicle are performed by the drive system without input from a human operator.

Figure 2:
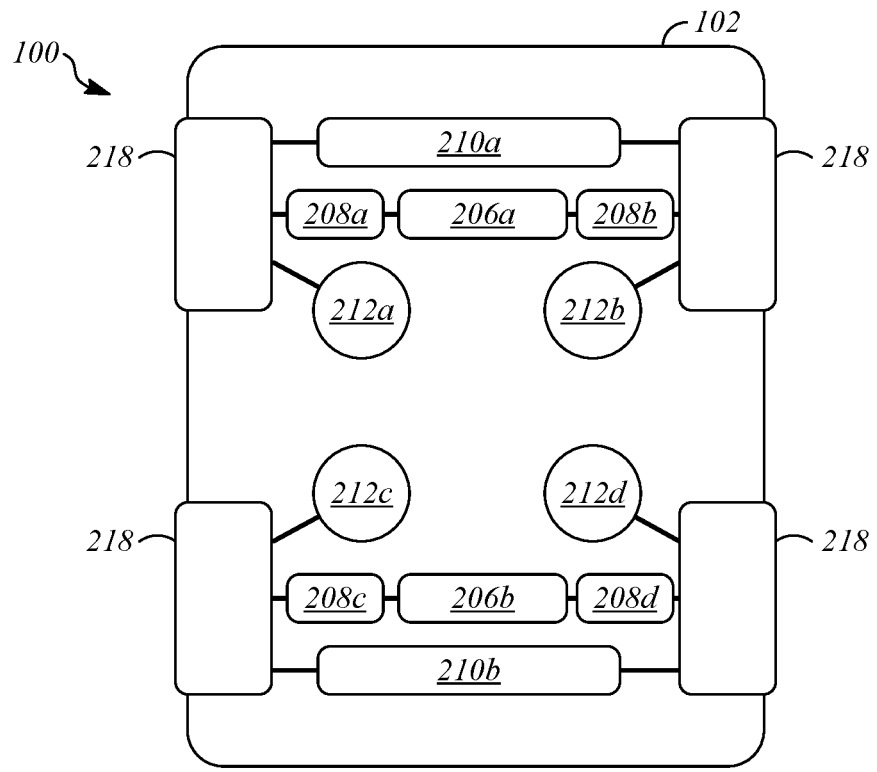
FIG. 2 is a schematic view of the vehicle.

Referring to FIG. 2, the vehicle 100 includes wheel and tire assemblies 218 (e.g., four) that are coupled to and support the vehicle body 102 (e.g., while travelling on a public roadway). The wheel and tire assemblies 218 may be coupled to the vehicle body 102 and may be operably connected to various components of the drive system 104.

The propulsion system 106 may include front propulsion components 206a and rear propulsions components 206b that are each connected to a pair of the wheel and tire assemblies 218 (e.g., front wheels and rear wheels). For example, the front propulsion components 206a and the rear propulsion components 206b may include motors for providing propulsion torque, gearboxes for modifying a drive ratio, drive shafts for transmitting torque to the wheel and tire assemblies 218, and/or other components.

The braking system 108 may include front left braking components 208a, front right braking components 208b, rear left braking components 208c, and rear right braking components 208d that provide deceleration torque via friction for decelerating the vehicle 100 when moving in the forward direction and/or when moving in the rearward direction.

The steering system 110 may include front steering components 210a and rear steering components 210b that include, for example, steering actuators and linkages that are operatively coupled each of the wheel and tire assemblies 218 to control the pivoted positions of the wheel and tire assemblies 218 about generally vertical axes.

The suspension system 112 is an active suspension system that transfers energy into and absorbs energy from the wheel and tire assemblies 218 with upward and downward movement relative to the vehicle body 102. Broadly speaking, the suspension system 112 controls vertical motion of the wheel and tire assemblies 218 relative to the vehicle body 102, for example, to ensure contact between the wheel and tire assemblies 218 and a surface of the roadway and to limit the influence of roadway conditions on undesirable movements of the vehicle body 102. As shown, the suspension system 112 may include front left suspension components 212a, front right suspension components 212b, rear left suspension components 212c, and rear right suspension components 212d.

The sensing system 114 includes sensors for observing external conditions of the vehicle 100 (e.g., location of the roadway and other objects) and conditions of the vehicle 100 (e.g., acceleration and conditions of the various subsystems and their components). The sensing system 114 may include sensors of various types, including dedicated sensors and/or functional components of the various subsystems (e.g., actuators may incorporate sensors or portions of actuators may function as sensors such as by measuring current draw of an electric motor incorporated in an actuator).

The control system 116 includes communication systems and components (i.e., for receiving sensor signals and sending control signals) and processing components (i.e., for processing the sensor signals and determining control operations), such as a controller. The control system 116 may include various control subsystems, for example, associated with (or as part) of one or more of the various other subsystems described herein (e.g., the propulsion system 106, the braking system 108, etc.).

Figure 3:
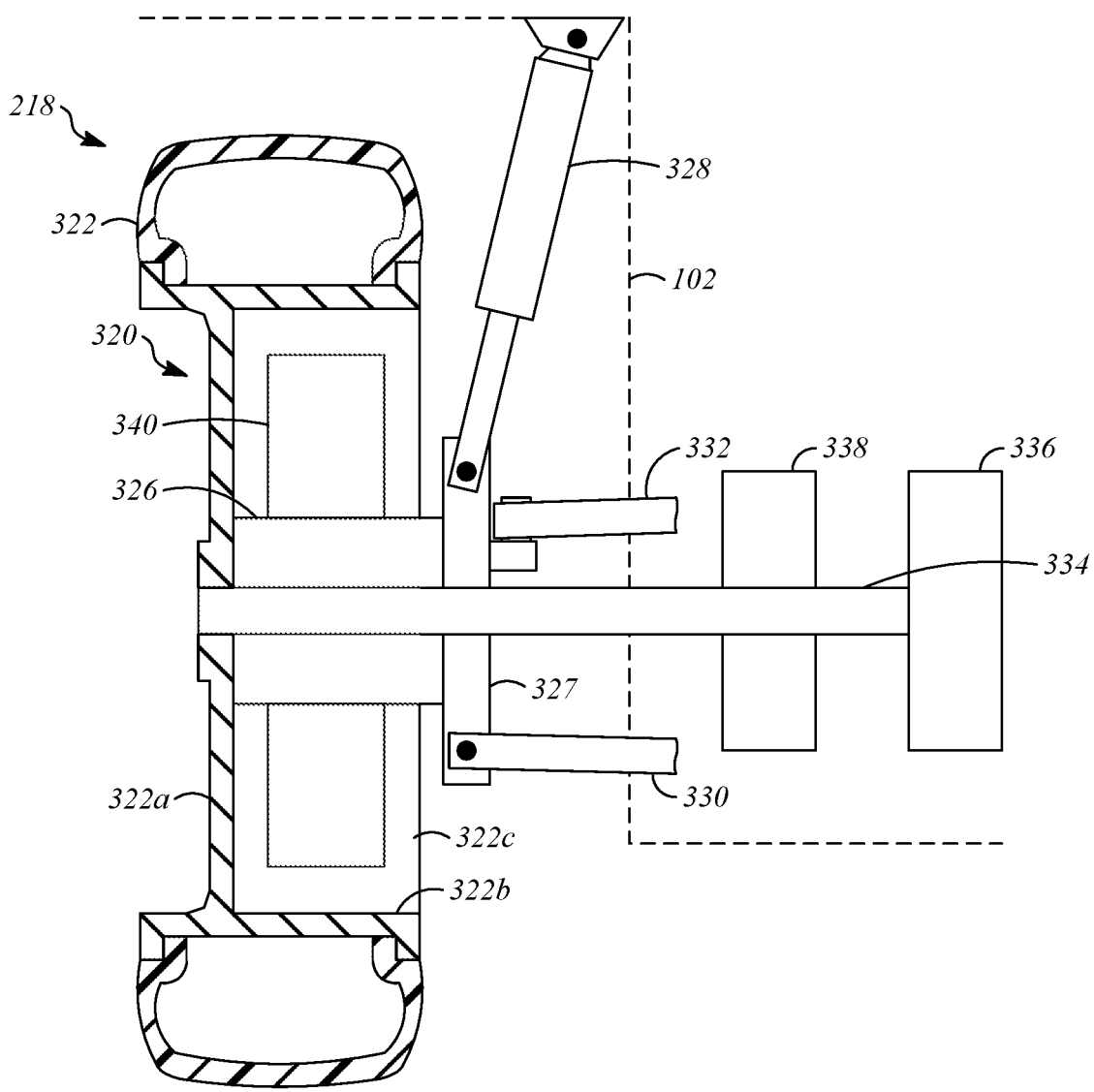
FIG. 3 is a front cross-section view showing a wheel and tire assembly of the vehicle including a mass actuator according to a first example.

FIG. 3 is a front cross-section view showing one of the wheel and tire assemblies 218 at the longitudinal midpoint of the wheel and tire assembly 218. Also shown in FIG. 3 are components of the propulsion system 106, the braking system 108, the steering system 110, and the suspension system 112, which are connected to the wheel and tire assembly 218 to support and control motion of the wheel and tire assembly 218.

The wheel and tire assembly 218 may include a wheel 320 and a tire 322. The wheel 320 may be a substantially rigid annular structure having a wheel disc portion 324a that is generally circular, a rim portion 324b that is generally cylindrical and is connected to the outer periphery of the wheel disc portion 324a, and an internal space 324c that is defined by the wheel disc portion 324a and the rim portion 324b in the area that is radially inward from the rim portion 324b. The tire 322 is supported by the rim portion 324b of the wheel 320. As an example, the tire 322 may be a tubeless pneumatic tire. Other types of wheels and tires can be used. In an alternative implementation, the wheel and tire are integrally formed components including, for example, a resilient wheel structure formed from synthetic rubber or plastic materials.

The wheel 320 is connected to a wheel hub 326. The wheel hub 326 includes a bearing to allow rotation of the wheel 320 while transferring vertical, longitudinal, and lateral forces through a suspension knuckle 327. The suspension knuckle 327 is connected to a suspension actuator 328 and a suspension linkage 330, which are connected to the vehicle body 102. The suspension actuator 328 may be an active suspension component that is operable to apply forces to the wheel 320 or may be a passive component such as a shock absorber or a strut. The suspension knuckle 327 is also connected to a steering linkage 332 that is able to pivot the wheel 320 on a generally vertical axis to control a steering angle for the wheel 320.

The wheel 320 is also connected to a drive shaft 334. The drive shaft 334 transmits torque to the wheel 320 from propulsion components such as motor and gearbox assembly 336. In the illustrated example, the motor and gearbox assembly 336 is located in the vehicle body 102. The vehicle 100 may also include an inboard braking system including a friction brake assembly 338 that is part of the sprung mass of the vehicle 100 and is located in the vehicle body 102 in the illustrated example.

Since the illustrated configuration does not package the braking components inside the wheel 320, space is available in the wheel 320 for other components. In particular, a mass actuator 340 is located in the internal space 324c of the wheel 320. The mass actuator 340 is an active suspension component that can be operated by control signals that are received from an external controller, such as the control system 116 or a dedicated active suspension controller, to apply a force to the unsprung mass of the vehicle 100. Additional components that can be packaged in the internal space 324c of the wheel 320 include heat sinks for active suspension components and steering actuators.

Figure 4:
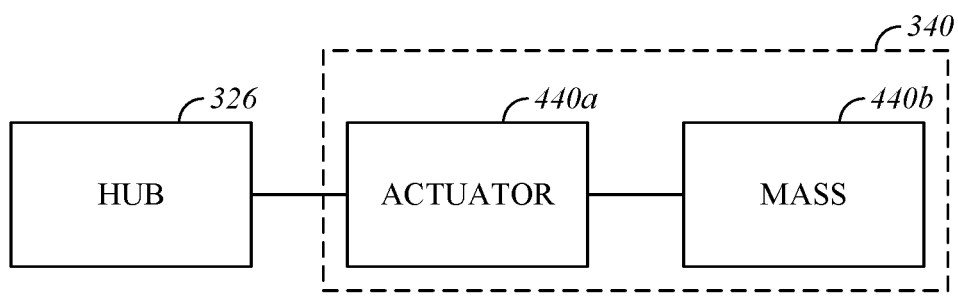
FIG. 4 is a block diagram that shows the mass actuator of FIG. 3.

FIG. 4 is a block diagram that shows the mass actuator 340. The mass actuator 340 may be connected to and supported by the wheel hub 326. In particular, the mass actuator 340 includes an actuator 440a and a mass 440b. The actuator 440a is a controllable component that is able to cause motion of the mass 440b relative to the wheel hub 326 (i.e., the actuator 440a accelerates the mass 440b in order to apply a force to the wheel hub 326). As an example, the actuator may be a linear actuator or an electromagnet. The mass 440b is supported such that it is movable over at least a small range of motion relative to the wheel hub 326. Examples of connections include flexible connectors, linear motion stages, and two degree-of-freedom translation stages. Various structures and configurations can be utilized for the actuator 440a and the mass 440b, including structures and configurations that will be described further herein.

Figure 5:
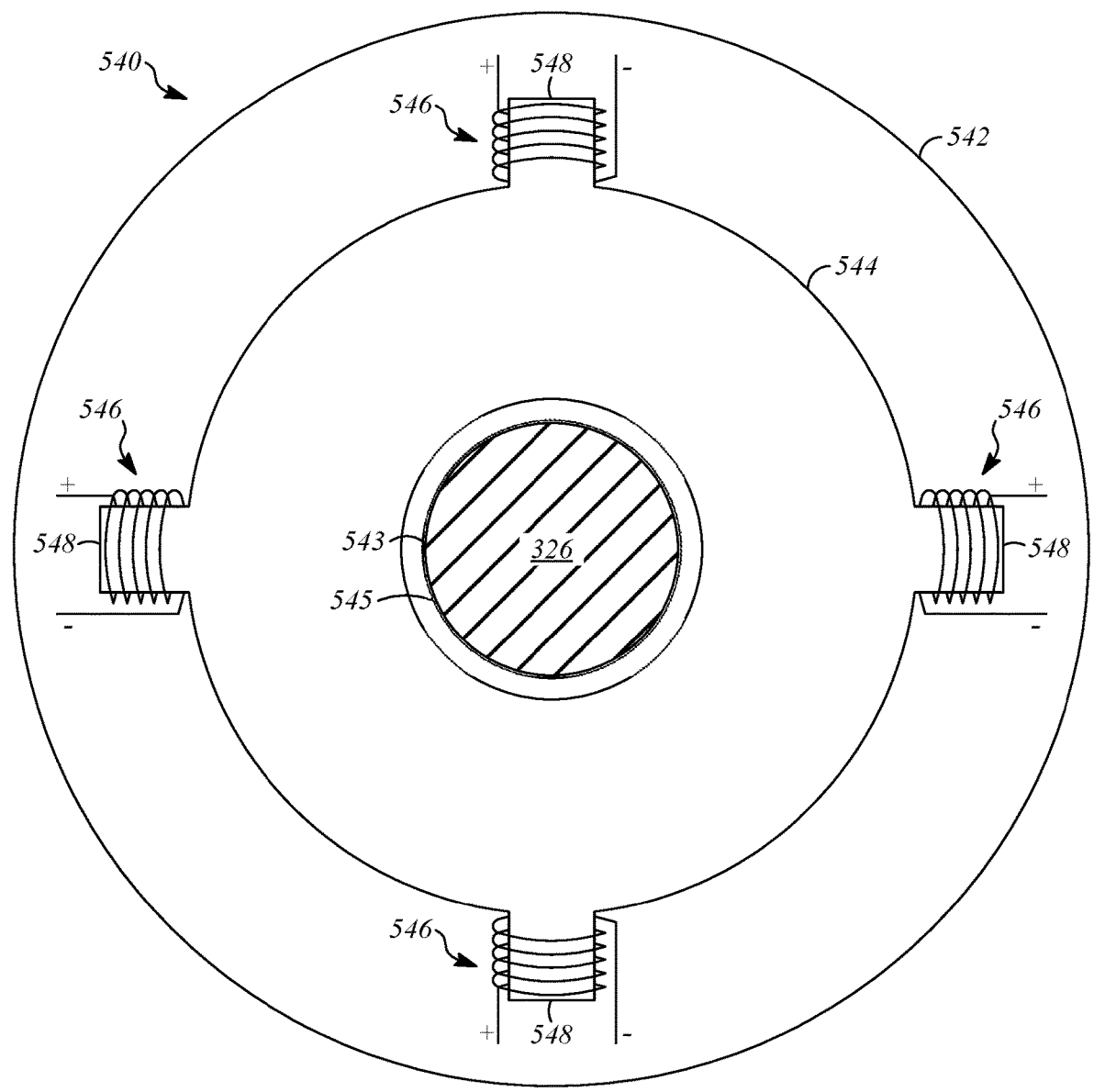
FIG. 5 is a schematic illustration showing a side view of a mass actuator according to a second example.

FIG. 5 is a schematic illustration showing a side view of a mass actuator 540 according to a second example. The mass actuator 540 is configured such that it can be packaged in the internal space of a vehicle wheel. For example, the mass actuator 540 can be incorporated in the wheel and tire assemblies 218, packaged in the internal space 324c of the wheel 320 in place of the mass actuator 340.

The mass actuator 540 includes a support structure 542 and a ring mass 544. The support structure 542 and the ring mass 544 may be generally disc-like structures that extend around the wheel hub 326, such as by provision of a first aperture 543 through the support structure 542 and a second aperture 545 through the ring mass 544.

The support structure 542 is mounted to the wheel hub, in a rigid or semi rigid fashion. The ring mass 544 is mounted to the support structure 542 in a manner that allows translation, such as two degree-of-freedom translation in the vertical and longitudinal directions of the wheel and tire assemblies 218. As examples, structures such as rails, slides, springs, or resilient elements (bands, straps, discs, etc.) can be used to mount the ring mass 544 to the support structure 542.

The mass actuator 540 includes actuators that are able to cause motion of the ring mass 544 relative to the support structure 542. In the illustrated example, the actuators are in the form of electromagnet coils 546 that are connected to and supported by the support structure 542. In the illustrated example, the electromagnet coils 546 are positioned near an outer periphery of the ring mass 544. Pole portions 548 are formed at the outer periphery of the ring mass 544, and each of the electromagnet coils 546 is positioned so that it can interact with a respective one of the pole portions. For example, the electromagnet coils 546 can be energized with positive or negative polarity to attract or repel the pole portions 548 and thereby cause motion of the ring mass 544. Combined actuation of two or more of the electromagnet coils 546 at different relative intensities can be used to control the direction of motion of the ring mass 544. Energization of the electromagnet coil 546 is controlled by a control system, as previously described, to apply forces to the wheel and tire assembly 218, such as in response to external forces.

Figure 6A:
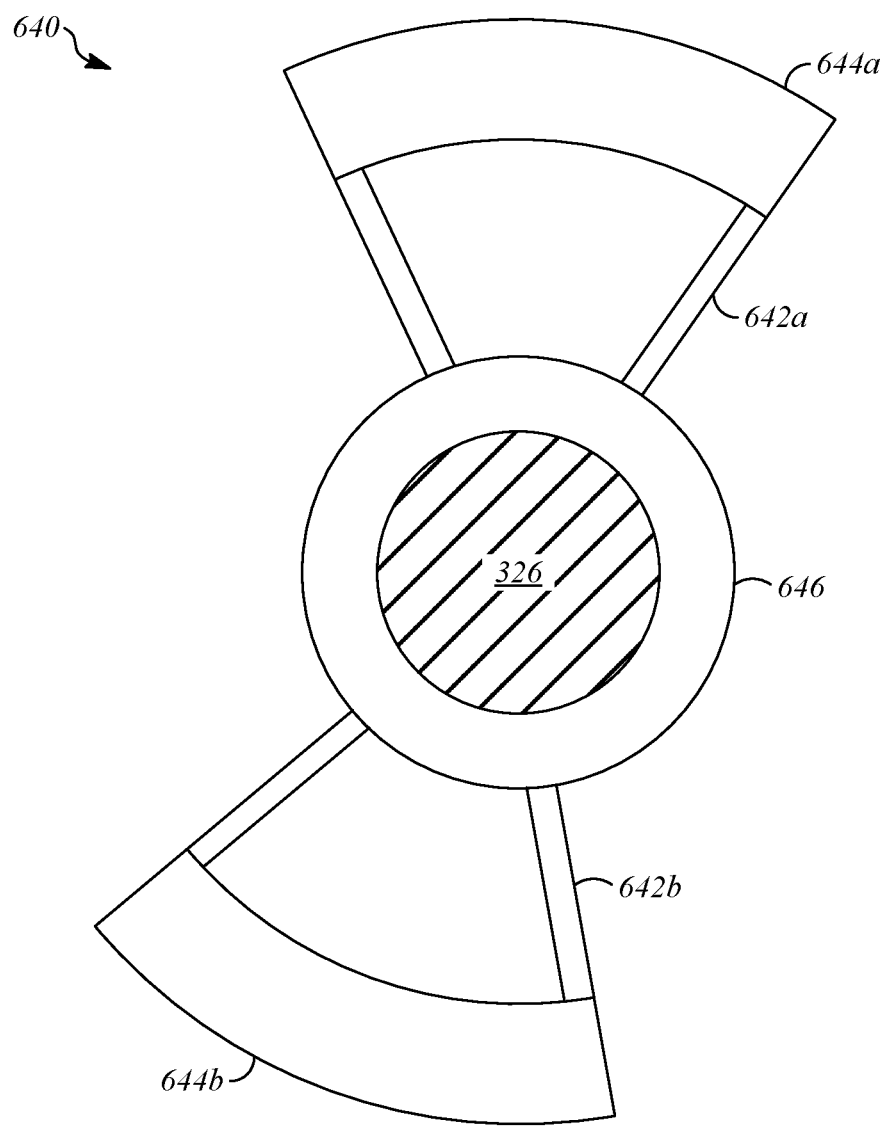
FIG. 6A is a schematic illustration showing a side view of a mass actuator according to a third example.
Figure 6B:
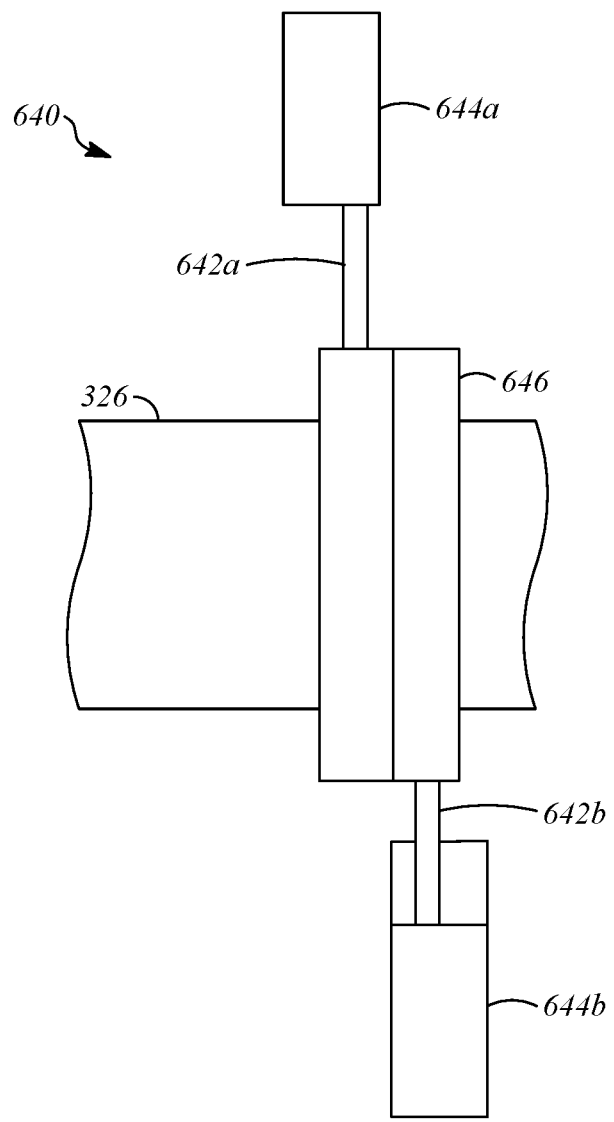
FIG. 6B is a schematic illustration showing a front view of the mass actuator of FIG. 6A.

FIG. 6A is a schematic illustration showing a side view of a mass actuator 640 according to a third example. FIG. 6B is a schematic illustration showing a front view of the mass actuator 640 according to the third example. The mass actuator 640 is configured such that it can be packaged in the internal space of a vehicle wheel. For example, the mass actuator 640 can be incorporated in the wheel and tire assemblies 218, packaged in the internal space 324c of the wheel 320 in place of the mass actuator 340.

The mass actuator 640 includes first supports 642a, second supports 642b, a first mass 644a, a second mass 644b, and a motor assembly 646. The motor assembly 646 is connected to the wheel hub 326 and is operable to cause rotation of the first mass 644a and the second mass 644b around a rotation axis of the wheel hub 326. The motor assembly 646 may include, for example, two independent electric motors that are each connected to one of the first mass 644a or the second mass 644b. Optionally, the motor assembly 646 could also include a lateral translation stage that causes translation along the rotation axis of the wheel hub 326 in order to cause lateral motion of the first mass 644a and the second mass 644b to thereby apply forces in the lateral direction.

The first mass 644a is positioned radially outward from the motor assembly 646 and is connected to it by first supports 642a. The first supports 642a may be, for example, rods that extend from the motor assembly 646 to the first mass 644a. The second mass 644b is positioned radially outward from the motor assembly 646 and is connected to it by second supports 642b. The second supports 642b may be, for example, rods that extend from the motor assembly 646 to the second mass 644b. As best seen in FIG. 6B, the first supports 642a and the first mass 644a are laterally offset from the second supports 642b and the second mass 644b to allow pivotal motion of each around a circular arc without interference.

Figure 7:
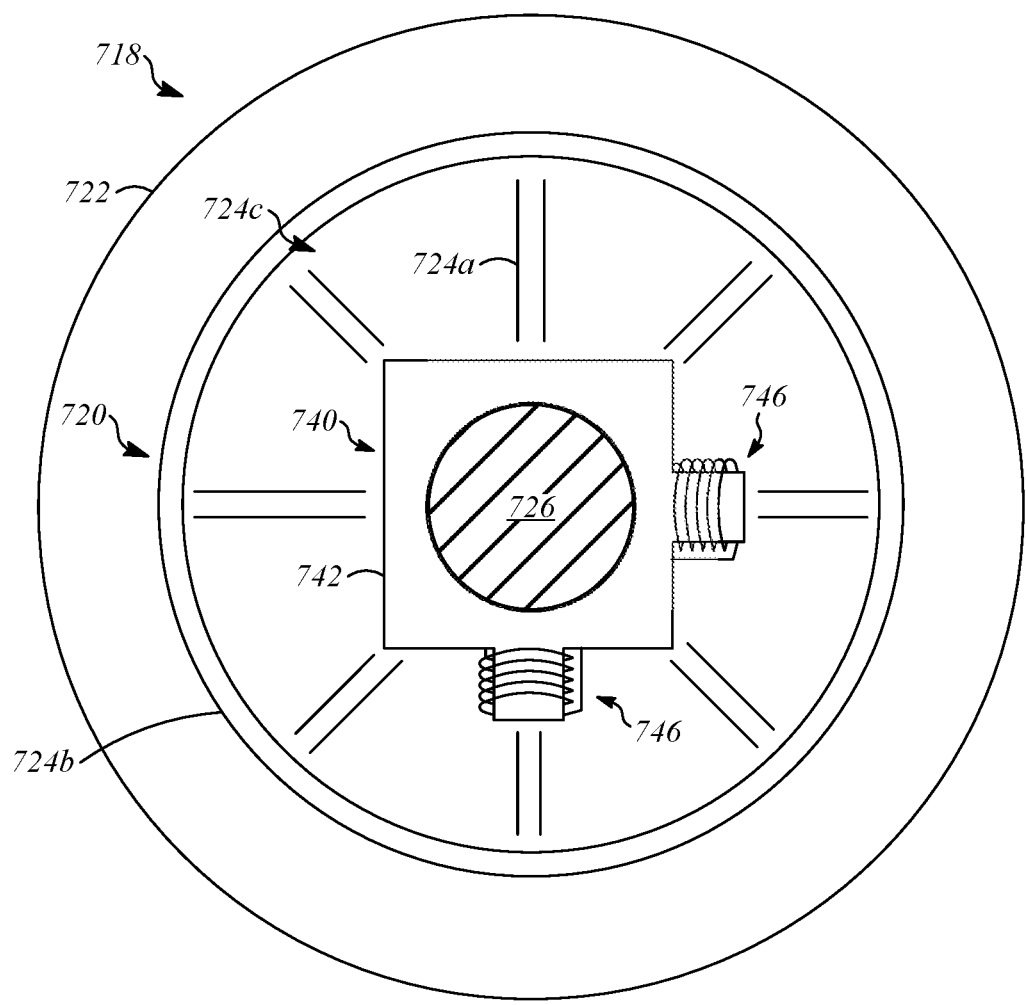
FIG. 7 is a schematic illustration showing a side view of a wheel and tire assembly that includes a mass actuator according to a fourth example.

FIG. 7 is a schematic illustration showing a side view of a wheel and tire assembly 718 that includes a mass actuator 740 according to a fourth example. The wheel and tire assembly 718 is similar to the wheel and tire assembly 218 except as described and may include components of the wheel and tire assembly 218 that are not explicitly described here. The wheel and tire assembly 718 includes a wheel 720 and a tire 722. The wheel 720 has a wheel disc portion 724a, a wheel rim portion 724b, and an internal space 724c in which the mass actuator 740 is disposed. The wheel 720 is supported by a wheel hub 726, which is similar to the wheel hub 326, but is mounted such that the wheel rim portion 724b is compliantly related to the wheel hub 326, to allow translation (e.g., in the longitudinal and vertical directions of the wheel 720) of the wheel rim portion 724b relative to the wheel hub 726. Thus, the wheel rim portion 724b may be connected to the wheel hub 726 for rotation around the rotation axis of the wheel hub 726 and nay be compliantly connected to the wheel hub 726 for translation in a plane that is generally perpendicular to the rotation axis of the wheel hub 726.

As an example, the wheel disc portion 724a may be formed from compliant members (e.g., deformable spokes made of synthetic rubber) to allow translational motion of the wheel rim portion 724b and the tire 722 relative to the wheel hub 726. The wheel rim portion 724b is formed from a ferromagnetic material or has a ferromagnetic material embedded in it (e.g., rubber having an embedded ferromagnetic belt).

The mass actuator 740 includes a support structure 742 that is connected to the wheel hub 726. The support structure 742 may be rigidly connected to the wheel hub 726 and may be mounted such that it does not rotate. One or more electromagnetic coils 746 are disposed on the support structure 742. In the illustrated example, one of the electromagnetic coils 746 is oriented in the longitudinal direction of the wheel and tire assembly 718, and another of the electromagnetic coils 746 is oriented in the vertical direction of the wheel and tire assembly 718. When activated (e.g., by supply of electrical current from a control system), the electromagnetic coils 746 exert an attractive or repulsive force that acts upon the ferromagnetic material of the wheel rim portion 724b to move the wheel rim portion 724b relative to the wheel hub 726, with the relative motion being allowed by the compliant nature of the wheel disc portion 724a.

In one implementation, the electromagnetic coils 746 are incorporated in a hub motor that is used to propel the wheel and tire assembly 718 relative to the wheel hub 726 (i.e., by inducing rotation of the wheel and tire assembly 718 on axis of the wheel hub 726 to cause motion of the vehicle). Radially balanced forces are applied during generation of propulsion torque, and imbalanced forces are applied by the electromagnetic coils 746 in order to apply reaction forces as part of active suspension control.

Figure 8:
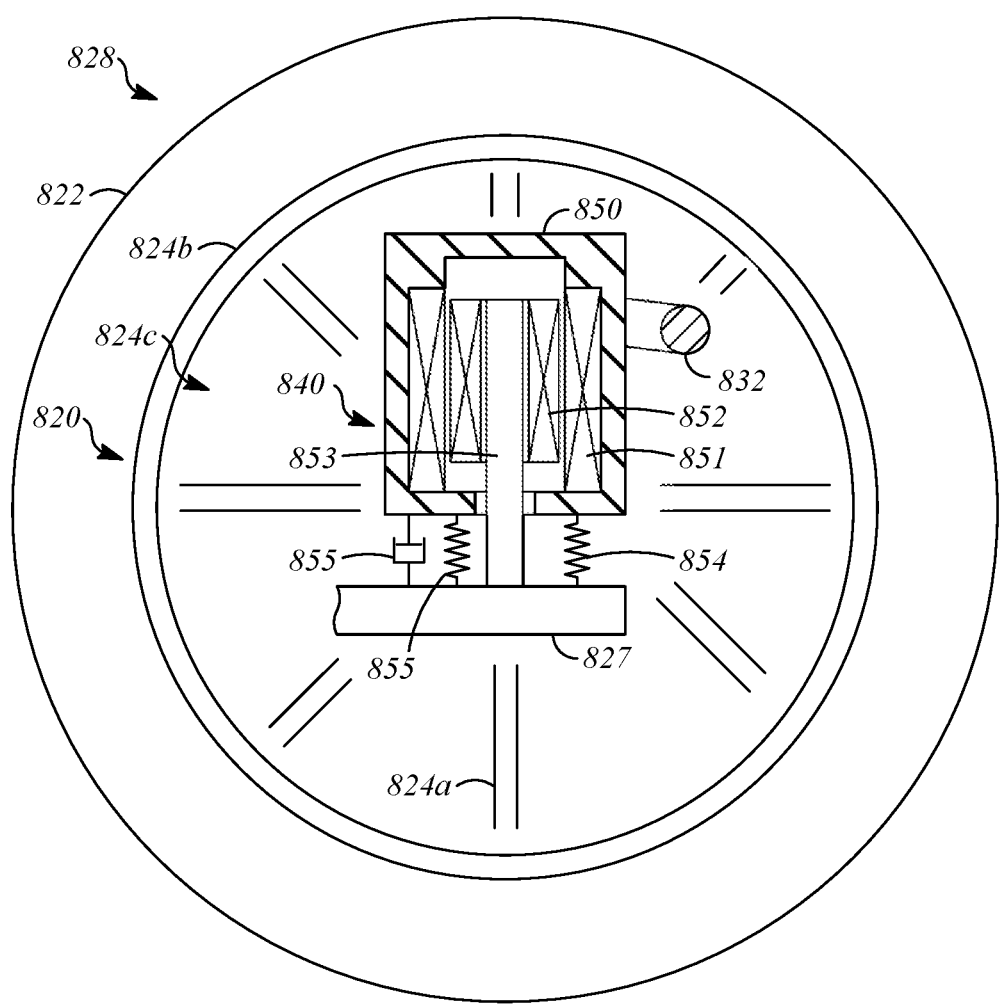
FIG. 8 is a schematic illustration showing a side view of a wheel and tire assembly that includes a mass actuator according to a fifth example.

FIG. 8 is a schematic illustration showing a side view of a wheel and tire assembly 818 that includes a mass actuator 840 according to a fifth example. As will be described, the components of the mass actuator 840 are also portions of a steering actuator that is connected to the wheel and tire assembly 818 as part of the unsprung mass.

The wheel and tire assembly 818 is similar to the wheel and tire assembly 218 except as described and may include components of the wheel and tire assembly 218 that are not explicitly described here. The wheel and tire assembly 818 includes a wheel 820 and a tire 822. The wheel 820 has a wheel disc portion 824a, a wheel rim portion 824b, and an internal space 824c in which the mass actuator 840 is disposed. The wheel 820 is supported by a wheel hub (not shown in FIG. 8), which is similar to the wheel hub 326.

The mass actuator 840 includes a housing 850, a stator 851, a rotor 852, a shaft 853, springs 854, and a damper 855 (e.g., a dashpot). The housing 850 and the stator 851 serve as mass for the mass actuator 840. The housing 850 may be connected to a steering linkage 832. The stator 851 and the rotor 852 are located in the housing 850 and define a rotational actuator. Electromagnetic interaction of the stator 851 and the rotor 852 is operable to pivot the wheel and tire assembly 818 to achieve a desired steering angle. The stator 851 and rotor 852 may further be configured for linear actuation (i.e., as a linear-rotary motor), to cause motion of the housing 850 and the stator 851 relative to a suspension knuckle 827 in order to apply a reaction force as part of active suspension control.

The springs 854 and the damper 855 are suspension components that regulate linear motion of the housing 850 toward and away from the suspension knuckle 827. The springs 854 may be connected to a suspension knuckle 827 and to the housing 850 to bias the housing 850 and the stator 851 to a neutral position relative to the suspension knuckle 827. For example, the springs 854 may bias the housing 850, the stator 851, and the rotor 852 toward the suspension knuckle 827. The damper 855 regulates motion of the housing 850 and the stator 851 such that they define a tuned mass damper to further regulate motion of the wheel 820.

Figure 9:
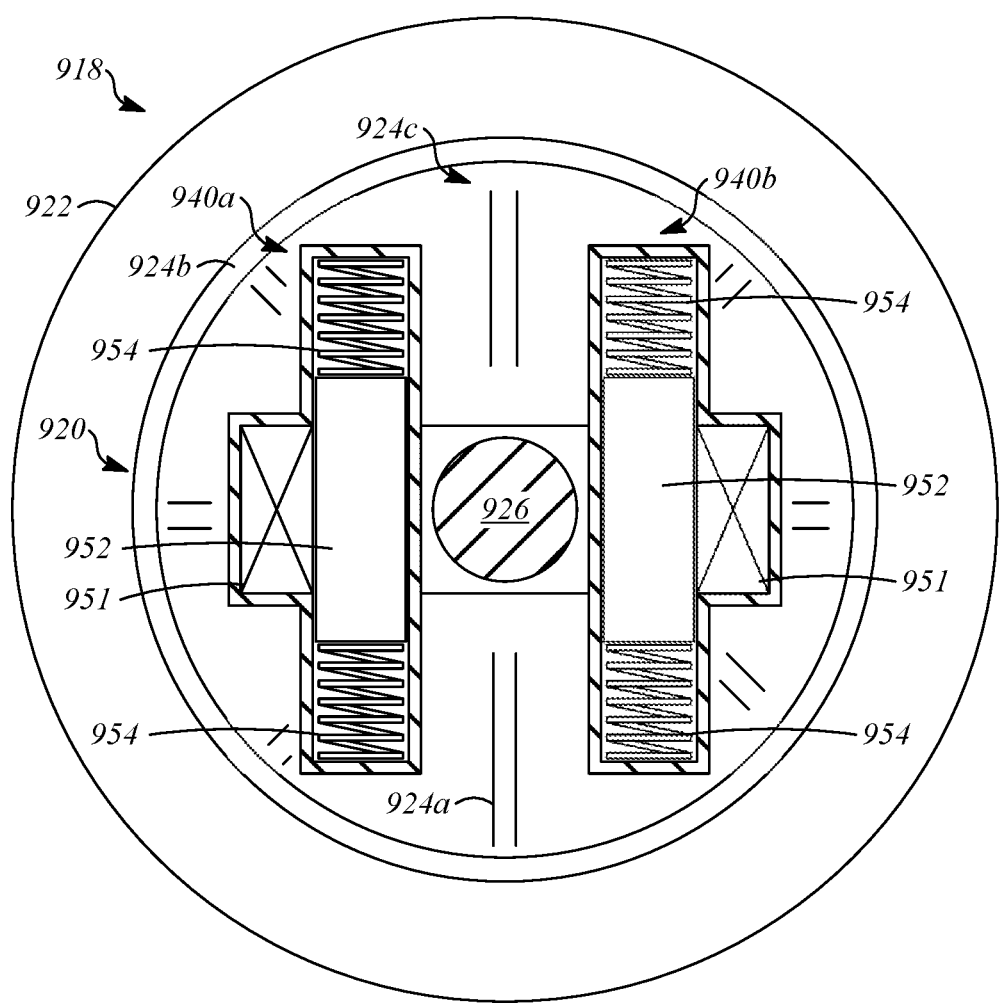
FIG. 9 is a schematic illustration showing a side view of a wheel and tire assembly that includes a first mass actuator and a second mass actuator according to a sixth example.

FIG. 9 is a schematic illustration showing a side view of a wheel and tire assembly 918 that includes a first mass actuator 940a and a second mass actuator 940b according to a sixth example.

The wheel and tire assembly 918 is similar to the wheel and tire assembly 218 except as described and may include components of the wheel and tire assembly 218 that are not explicitly described here. The wheel and tire assembly 918 includes a wheel 920 and a tire 922. The wheel 920 has a wheel disc portion 924a, a wheel rim portion 924b, and an internal space 924c in which the first mass actuator 940a and the second mass actuator 940b are disposed. The wheel 920 is supported by a wheel hub 926, which is similar to the wheel hub 326.

This implementation utilizes space in the wheel and tire assembly 918 to package two mass actuators on opposite sides of the wheel hub 926 from one another. In the illustrated example, the first mass actuator 940a and the second mass actuator 940b each act in a generally vertical direction and are located adjacent to the wheel hub 926, with the first mass actuator 940a being located on a first longitudinal side of the wheel hub 926 and with the second mass actuator 940b being located on a second longitudinal side of the wheel hub 926. The first mass actuator 940a and the second mass actuator 940b are each supported by and connected to the wheel hub 926 and are illustrated as acting in a vertical direction but could be oriented otherwise.

The first mass actuator 940a and the second mass actuator 940b each include a housing 950, a linear motor 951, a mass 952, and springs 954. The linear motor 951 is operable to move (i.e., accelerate) the mass 952 within the housing 950 against the springs 954, which bias the mass 952 to a neutral position. The linear motor 951 is operated to cause motion of the mass 952 in order to apply a reaction force as part of active suspension control.

Figure 10:
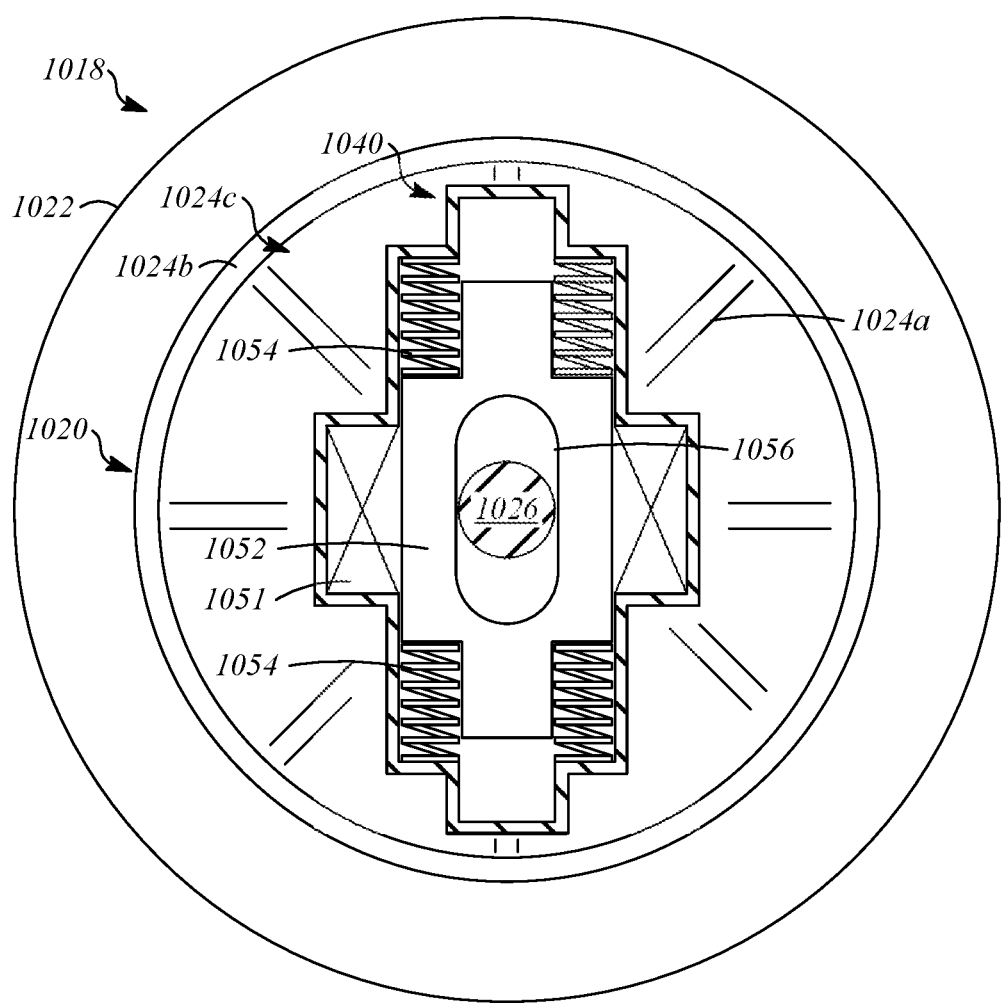
FIG. 10 is a schematic illustration showing a side view of a wheel and tire assembly that includes a mass actuator according to a seventh example.

FIG. 10 is a schematic illustration showing a side view of a wheel and tire assembly 1018 that includes a mass actuator 1040 according to a seventh example.

The wheel and tire assembly 1018 is similar to the wheel and tire assembly 218 except as described and may include components of the wheel and tire assembly 218 that are not explicitly described here. The wheel and tire assembly 1018 includes a wheel 1020 and a tire 1022. The wheel 1020 has a wheel disc portion 1024a, a wheel rim portion 1024b, and an internal space 1024c in which the mass actuator 1040 is disposed. The wheel 1020 is supported by a wheel hub 1026, which is similar to the wheel hub 326.

This implementation packages a mass actuator along a radius of the wheel 1020 to utilize nearly all of the radial dimension of the internal space 1024c. The mass actuator 1040 is supported by and connected to the wheel hub 1026 and are illustrated as acting in a vertical direction but could be oriented otherwise. The mass actuator 1040 includes a housing 1050, a linear motor 1051, a mass 1052, and springs 1054. The linear motor 1051 is operable to move (i.e., accelerate) the mass 1052 within the housing 1050 against the springs 1054, which bias the mass 1052 to a neutral position. The linear motor 1051 is operated to cause motion of the mass 1052 in order to apply a reaction force as part of active suspension control.

The mass actuator 1040 is positioned such that the wheel hub 1026 extends through the housing 1050 and the mass 1052. This allows the stroke of the mass to be maximized by utilizing as much of the radial dimension of the internal space 1024c of the wheel 1020 as possible. In order to allow movement of the mass 1052 relative to the wheel hub 1026, a slot 1056 is formed through the mass 1052. The wheel hub 1026 passes through the slot 1056, and the slot 1056 is elongate in the direction of the stroke of the mass 1052 to allow relative motion.

Figure 11:
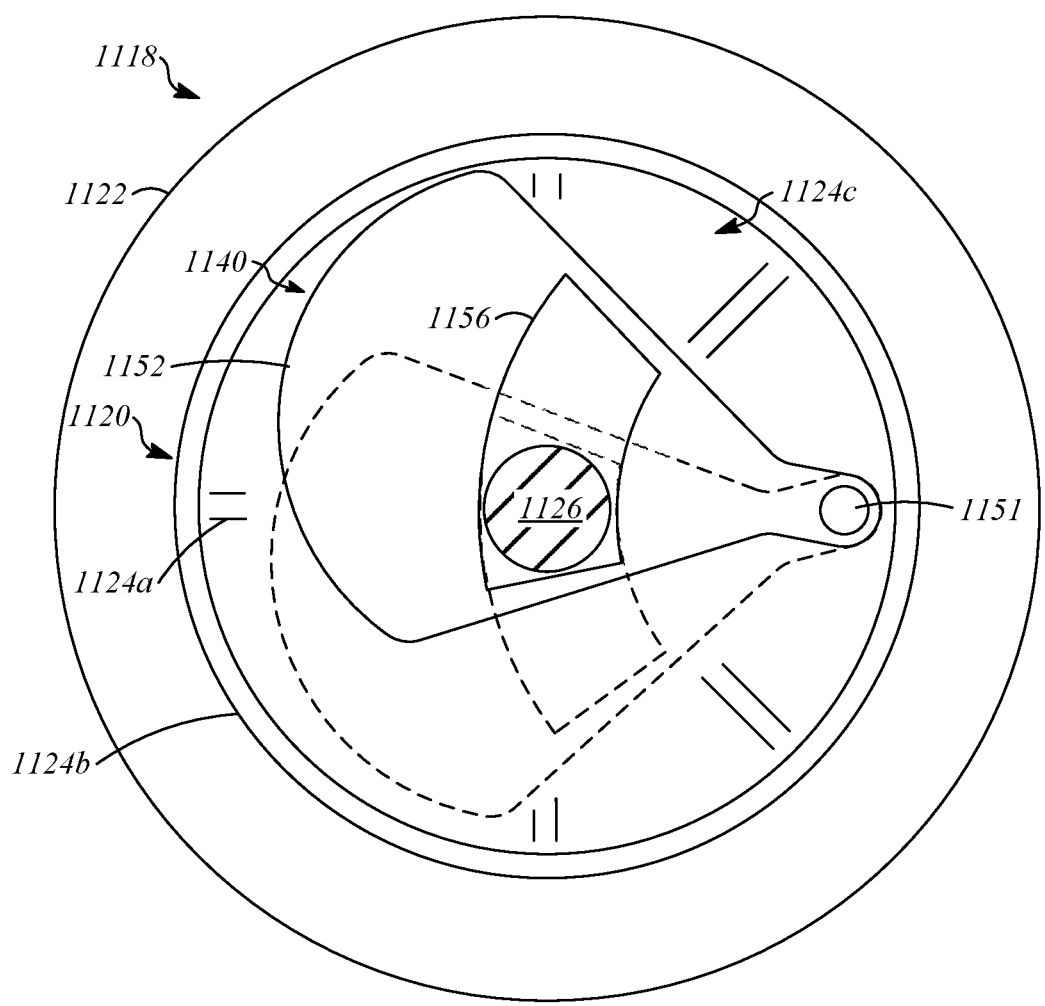
FIG. 11 is a schematic illustration showing a side view of a wheel and tire assembly that includes a mass actuator according to an eighth example.

FIG. 11 is a schematic illustration showing a side view of a wheel and tire assembly 1118 that includes a mass actuator 1140 according to an eighth example.

The wheel and tire assembly 1118 is similar to the wheel and tire assembly 218 except as described and may include components of the wheel and tire assembly 218 that are not explicitly described here. The wheel and tire assembly 1118 includes a wheel 1120 and a tire 1122. The wheel 1120 has a wheel disc portion 1124a, a wheel rim portion 1124b, and an internal space 1124c in which the mass actuator 1140 is disposed. The wheel 1120 is supported by a wheel hub 1126, which is similar to the wheel hub 326.

This implementation packages a mass actuator in in the internal space of the wheel 1120 and accommodates a relatively large mass and stroke by rotationally actuating the mass along an axis that is generally parallel to the rotation axis of the wheel 1120 and at a location that is offset from the wheel hub 1126. The mass actuator 1140 is supported by and connected to the wheel hub 1126 and are illustrated as acting in a vertical direction but could be oriented otherwise. The mass actuator 1140 includes a housing 1150, a motor assembly such as a rotary motor 1151, and a mass 1152. The mass actuator 1140 may also include springs (not shown) to bias the mass 1152 to a neutral position. The rotary motor 1151 is operable to move (i.e., accelerate) the mass 1152 by rotating it around an axis that is generally parallel to the rotation axis of the wheel 1120 and at a location that is offset from the wheel hub 1126. The rotary motor 1151 is operated to cause motion of the mass 1152 in order to apply a reaction force as part of active suspension control.

The mass actuator 1140 is positioned such that the wheel hub 1126 extends through the mass 1152. This allows the size and stroke of the mass to be maximized. In order to allow movement of the mass 1152 relative to the wheel hub 1126, a slot 1156 is formed through the mass 1152. The wheel hub 1126 passes through the slot 1156. The slot 1156 is arcuate along an arc having its radial center on the axis of the rotary motor 1151 so that the slot 1156 provides clearance for the wheel hub 1126 as the mass 1152 rotates. A first position of the mass 1152 is shown in solid lines, and a second position of the mass 1152 is shown in broken lines to illustrate rotation relative to the first position.

Although the mass actuator 1140 is shown in an implementation including only one mass actuator, additional mass actuators similar to the mass actuator 1140 could be included and packaged in a laterally offset manner and with their rotation axes at differing locations to allow control of the direction of the reaction force applied by simultaneous actuation of multiple mass actuators.

Figure 12:
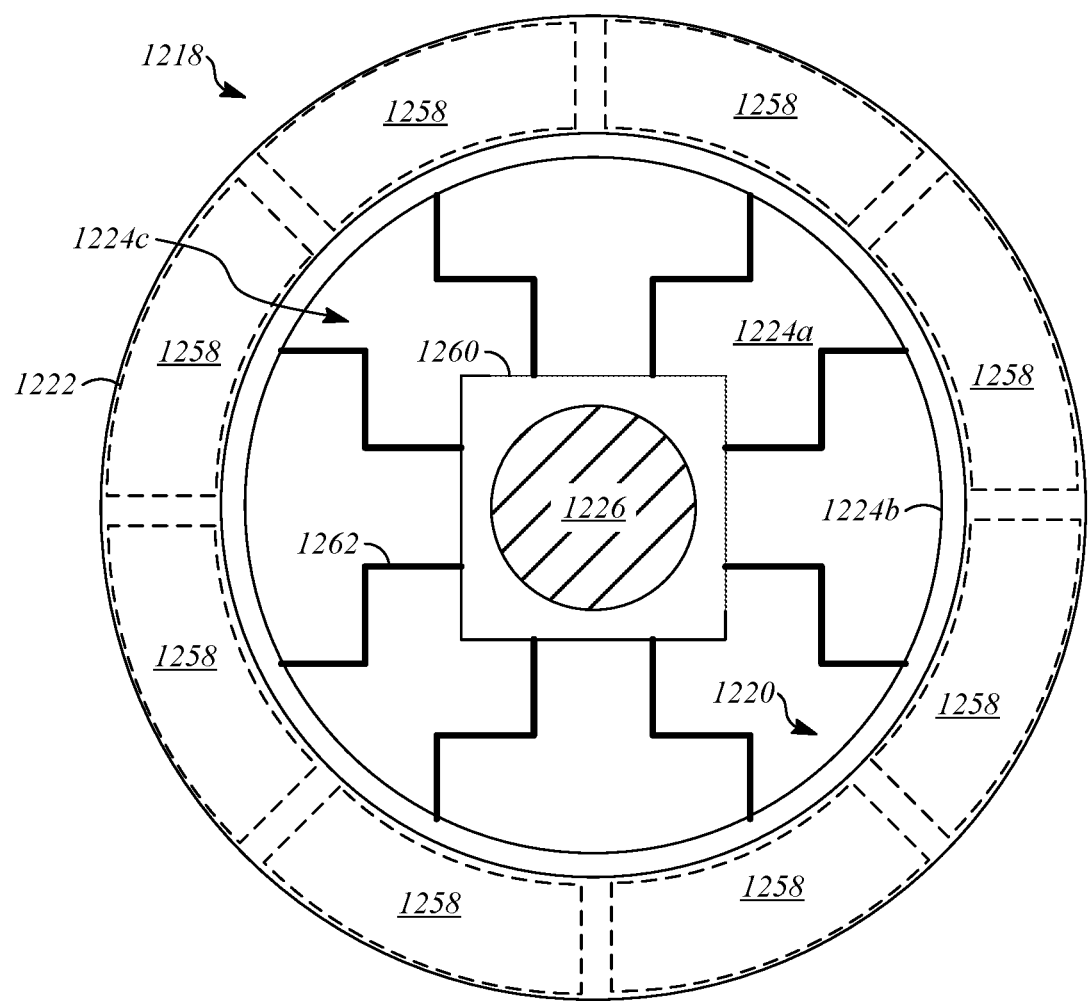
FIG. 12 is a schematic illustration showing a side view of a wheel and tire assembly that includes pneumatic application of reaction force.

FIG. 12 is a schematic illustration showing a side view of a wheel and tire assembly that includes pneumatic application of reaction force.

The wheel and tire assembly 1218 is similar to the wheel and tire assembly 218 except as described and may include components of the wheel and tire assembly 218 that are not explicitly described here. The wheel and tire assembly 1218 includes a wheel 1220 and a tire 1222. The wheel 1220 has a wheel disc portion 1224a, a wheel rim portion 1224b, and an internal space 1224c. The wheel 1220 is supported by a wheel hub 1226, which is similar to the wheel hub 326.

The tire 1222 includes internal chambers 1258. Eight of the internal chambers 1258 are included in the illustrated implementation, but other numbers of internal chambers can be included. The internal chambers 1258 are sealed relative to each other and can be pressurized separately at differing pressures. The internal chambers 1258 are positioned in series around the periphery of the tire 1222 and may be separated from one another by internal walls of the tire 1222, which extend laterally in the illustrated implementation. In alternative implementations, the internal walls may be canted laterally and/or radially.

The internal chambers 1258 are connected to a manifold 1260 by fluid passages 1262 (e.g., conduits). The manifold 1260 includes valves to supply and bleed air from the internal chambers 1258 and may be connected to a pressurized air source.

During operation of the vehicle, the pressures in the internal chambers 1258 may be modulated uniformly or differentially to adapt to driving conditions or to apply reaction forces. As an example, air pressure may be bled from internal chambers 1258 at portions of the tire 1222 that are not in contact with the road and supplied to internal chambers 1258 that are in contact with the road on a continually varying basis, based in part on the rotational position of the tire 1222.

Figure 13:
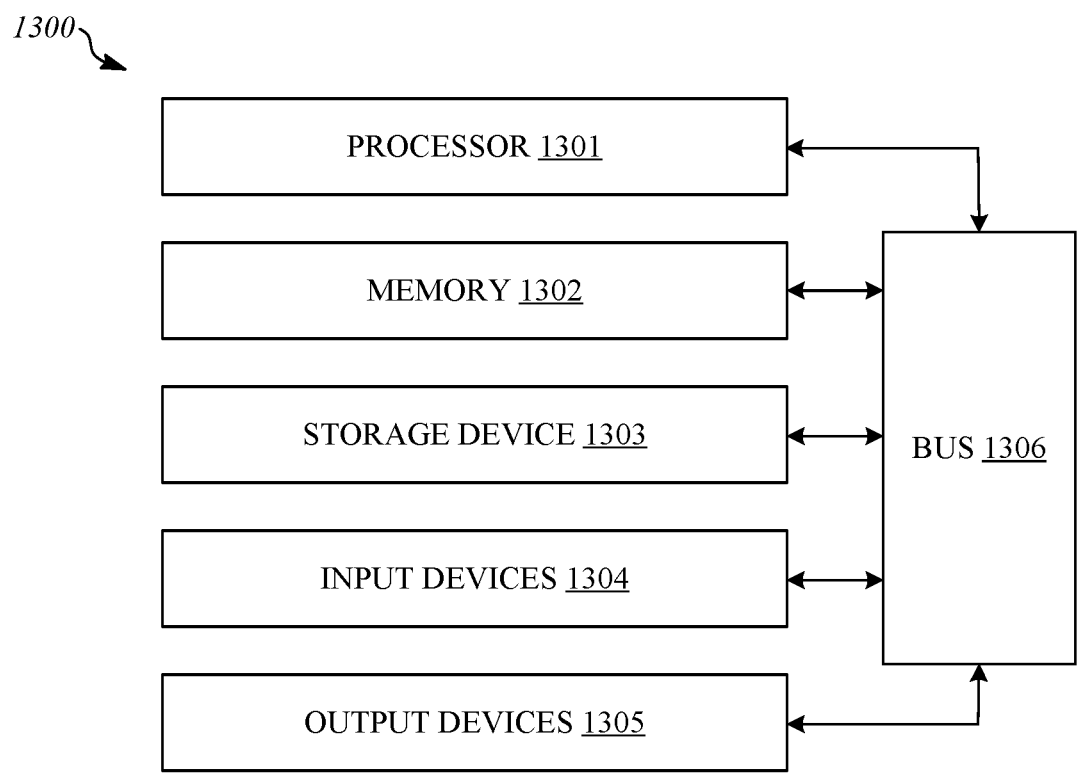
FIG. 13 is a schematic view of a controller.

FIG. 13 is a schematic view of a controller 1300 that may be used to implement the control system 116 and/or other control systems of the vehicle 130. The controller 1300 may include a processor 1301, a memory 1302, a storage device 1303, one or more input devices 1304, and one or more output devices 1305. The controller 1300 may include a bus 1306 or a similar device to interconnect the components for communication. The processor 1301 is operable to execute computer program instructions and perform operations described by the computer program instructions. As an example, the processor 1301 may be a conventional device such as a central processing unit. The memory 1302 may be a volatile, high-speed, short-term information storage device such as a random-access memory module. The storage device 1303 may be a non-volatile information storage device such as a hard drive or a solid-state drive. The input devices 1304 may include any type of human-machine interface such as buttons, switches, a keyboard, a mouse, a touchscreen input device, a gestural input device, or an audio input device. The output devices 1305 may include any type of device operable to provide an indication to a user regarding an operating state, such as a display screen or an audio output, or any other functional output or control.

As used in the claims, phrases in the form of "at least one of A, B, or C" should be interpreted to encompass only A, or only B, or only C, or any combination of A, B and C.

What is claimed is:

1. A vehicle wheel assembly, comprising:
a wheel that defines an internal space;
a tire supported by the wheel;
a wheel hub that is rotatably connected to the wheel and is located in the internal space; and
a support structure that is connected to the wheel hub;
a ring mass that extends around the wheel hub and is connected to the support structure so that it is movable with respect to the wheel hub; and
electromagnetic coils that are connected to the support structure and configured to attract or repel the ring mass, wherein the electromagnetic coils are located outward relative to an outer periphery of the ring mass.

2. The vehicle wheel assembly of claim 1, wherein the ring mass includes a ring mass aperture and the wheel hub extends through the ring mass aperture.

3. The vehicle wheel assembly of claim 1, wherein the outer periphery of the ring mass is generally circular.

4. The vehicle wheel assembly of claim 1, wherein the ring mass includes pole portions that extend outward relative to the outer periphery of the ring mass.

5. The vehicle wheel assembly of claim 4, wherein each of the electromagnetic coils is positioned adjacent to a respective one of the pole portions of the ring mass for electromagnetic interaction with the respective one of the pole portions of the ring mass.

6. The vehicle wheel assembly of claim 4, wherein the outer periphery of the ring mass is generally circular.

7. The vehicle wheel assembly of claim 1, wherein the support structure includes a support structure aperture, the wheel hub extends through the support structure aperture, and the support structure is connected to the wheel hub at the support structure aperture.

8. The vehicle wheel assembly of claim 7, wherein the support structure is rigidly connected to the wheel hub.

9. The vehicle wheel assembly of claim 1, wherein the ring mass is connected to the support structure for movement with respect to the wheel hub in a vertical direction of the vehicle wheel assembly and in a longitudinal direction of the vehicle wheel assembly.

10. A vehicle, comprising:
a wheel that defines an internal space;
a tire supported by the wheel;
a wheel hub that is rotatably connected to the wheel;
a vehicle body;
a suspension linkage that connects the wheel hub to the vehicle body;
an inboard braking system that is located in the vehicle body;
a drive shaft that connects the inboard braking system to the wheel;
a support structure that is connected to the wheel hub;
a mass that is located in the internal space of the wheel and is supported by the support structure for movement with respect to the wheel hub, wherein the mass has an outer periphery; and
an electromagnetic coil that is connected to the support structure, located outward relative to the outer periphery of the mass, and is configured to accelerate the mass to apply active suspension control.

11. The vehicle of claim 10, wherein an opening is formed in the mass and the wheel hub extends through the opening.

12. The vehicle of claim 10, wherein a pole portion is formed on the mass, and the electromagnetic coil is configured to attract or repel the pole portion.

13. The vehicle of claim 12, wherein the outer periphery of the mass is generally circular, and the pole portion extends outward relative to the outer periphery of the mass.

14. The vehicle of claim 10, wherein the electromagnetic coil is configured to accelerate the mass by energization of the electromagnetic coil to attract the mass and by energization of the electromagnetic coil to repel the mass.

15. The vehicle of claim 10, wherein the mass is in the form of a ring that extends around the wheel hub.

16. A vehicle wheel assembly, comprising:
a wheel that defines an internal space;
a tire supported by the wheel;
a wheel hub that is rotatably connected to the wheel;
a support assembly that is connected to the wheel hub;
a mass that is located in the internal space of the wheel and is connected to the wheel hub by the support assembly so that the mass is able to translate in a vertical direction of the vehicle wheel assembly and in a longitudinal direction of the vehicle wheel assembly; and
an actuator that is located in the internal space of the wheel, includes electromagnetic coils that are connected to and supported by the support assembly, and is configured to cause translation of the mass in the vertical direction of the wheel and in the longitudinal direction of the wheel to apply active suspension control, wherein the actuator includes pole portions that are formed at an outer periphery of the ring mass and the electromagnetic coils are configured to attract or repel the pole portions.

17. The vehicle wheel assembly of claim 16, wherein the mass is a ring mass that extends around the wheel hub.

18. The vehicle wheel assembly of claim 16, wherein the electromagnetic coils are located outward relative to the outer periphery of the ring mass.

19. The vehicle wheel assembly of claim 16, wherein at least part of the support assembly is located radially outward from the mass.

20. The vehicle wheel assembly of claim 16, wherein the outer periphery of the ring mass is generally circular.

* * * * *